United States Patent
Kawanishi

(10) Patent No.: US 9,228,884 B2
(45) Date of Patent: Jan. 5, 2016

(54) HAND-OPERATED WEIGHING SYSTEM AND WEIGHING WORK METHOD

(75) Inventor: Shozo Kawanishi, Hyogo (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 299 days.

(21) Appl. No.: 13/824,861

(22) PCT Filed: May 23, 2011

(86) PCT No.: PCT/JP2011/002854
§ 371 (c)(1),
(2), (4) Date: Jun. 10, 2013

(87) PCT Pub. No.: WO2012/039080
PCT Pub. Date: Mar. 29, 2012

(65) Prior Publication Data
US 2013/0264127 A1 Oct. 10, 2013

(30) Foreign Application Priority Data

Sep. 22, 2010 (JP) ................................. 2010-211605

(51) Int. Cl.
*G01G 19/393* (2006.01)
*B07C 5/20* (2006.01)
(Continued)

(52) U.S. Cl.
CPC ................ *G01G 19/393* (2013.01); *B07C 5/20* (2013.01); *G01G 13/29* (2013.01); *G01G 23/3707* (2013.01)

(58) Field of Classification Search
CPC ... G01G 19/00; G01G 19/397; G01G 19/393; G01G 9/00; G01G 15/00; G01G 13/29; G01G 13/2943; G01G 23/3707; G01G 23/37; B07C 5/18; B07C 5/20

USPC ......................................... 177/1, 25.17, 25.18
See application file for complete search history.

(56) References Cited

U.S. PATENT DOCUMENTS

| | | | |
|---|---|---|---|
| 3,727,706 A * | 4/1973 | Streater et al. ..................... 177/1 |
| 4,139,070 A * | 2/1979 | Hanson et al. ................ 177/200 |
| 4,396,078 A * | 8/1983 | Minamida et al. ................ 177/1 |

(Continued)

FOREIGN PATENT DOCUMENTS

| | | | | |
|---|---|---|---|---|
| EP | 0271352 A2 * | 6/1988 | .......... G01G 19/393 |
| EP | 2 179 930 A2 | 4/2010 | |

(Continued)

OTHER PUBLICATIONS

Extended European Search Report for EP 11826533.9, dated Jan. 27, 2014.

(Continued)

*Primary Examiner* — Randy W Gibson
(74) *Attorney, Agent, or Firm* — Marshall, Gerstein & Borun LLP

(57) ABSTRACT

A weighing system (100) comprises a platform scale (50) on which a container containing objects is placed; and a hand-operated combination weigher 10 including a plurality of weighing trays 12 on which the objects are put; wherein a controller of the weighing system (100) derives a target weight of the objects in the combination weigher (10) using a weight of the container which is weighed by the platform scale (50); and the controller selects a combination of the weighing trays (12) so that a combination weight of the objects on the weighing trays (12) falls within an allowable range of the target weight.

6 Claims, 4 Drawing Sheets

(51) Int. Cl.
  *G01G 13/29* (2006.01)
  *G01G 23/37* (2006.01)

(56) References Cited

U.S. PATENT DOCUMENTS

| | | | | |
|---|---|---|---|---|
| 4,428,179 | A * | 1/1984 | Jordan et al. | 53/502 |
| 4,442,910 | A * | 4/1984 | Mikami | 177/25.18 |
| 4,549,619 | A * | 10/1985 | Fujiwara | 177/25.18 |
| 4,661,917 | A * | 4/1987 | Haze et al. | 700/305 |
| 4,720,961 | A * | 1/1988 | Jordan | 53/502 |
| 4,753,306 | A * | 6/1988 | Mosher | 177/25.19 |
| 4,821,820 | A * | 4/1989 | Edwards et al. | 177/25.18 |
| 4,838,368 | A * | 6/1989 | Sato et al. | 177/25.18 |
| 4,901,807 | A * | 2/1990 | Muskat et al. | 177/25.18 |
| 5,040,625 | A * | 8/1991 | Yamanaka | 177/25.18 |
| 5,889,235 | A | 3/1999 | Kawanishi et al. | |
| 8,592,695 | B2 * | 11/2013 | Las Navas Garcia | 177/1 |
| 2009/0057034 | A1* | 3/2009 | Schulzki | 177/1 |
| 2010/0282840 | A1* | 11/2010 | Henry | 235/382 |
| 2010/0307839 | A1* | 12/2010 | Bradley | 177/1 |
| 2012/0132472 | A1* | 5/2012 | Las Navas Garcia | 177/1 |

FOREIGN PATENT DOCUMENTS

| | | | | |
|---|---|---|---|---|
| EP | 2620756 A1 * | 7/2013 | | G01G 19/393 |
| JP | 56-158916 A | 12/1981 | | |
| JP | 63-148129 A | 6/1988 | | |
| JP | 4-49828 | 4/1992 | | |
| JP | 11-044571 A | 2/1999 | | |
| JP | 11-153474 A | 6/1999 | | |
| JP | 2006-125925 A | 5/2006 | | |
| JP | 2007-064704 A | 3/2007 | | |
| WO | WO-2005/095904 A1 | 10/2005 | | |

OTHER PUBLICATIONS

International Search Report for PCT/JP2011/002854, mailed Jun. 14, 2011.

* cited by examiner

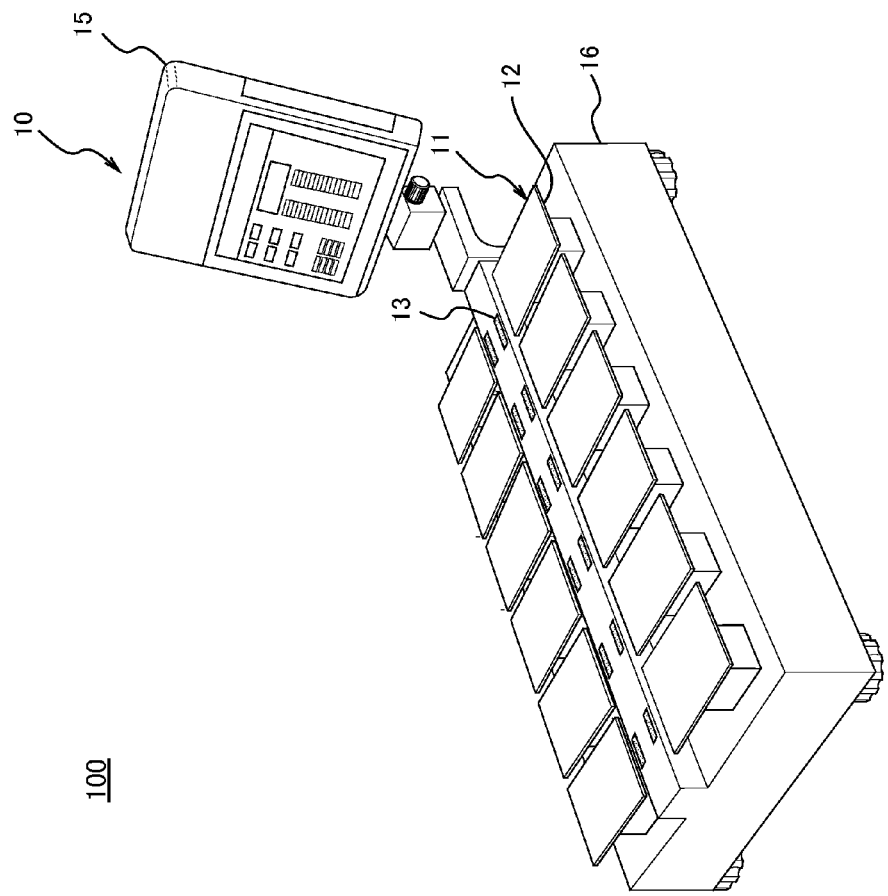
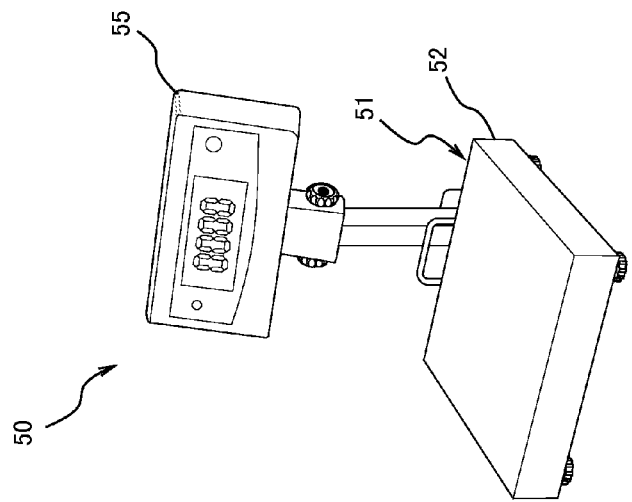
Fig. 1

HAND-OPERATED WEIGHING SYSTEM AND WEIGHING WORK METHOD

TECHNICAL FIELD

The present invention relates to a weighing system and a weighing work method. Particularly, the present invention relates to improvement of a weighing system including a hand-operated combination weigher and a platform scale, and improvement of a weighing work method using the hand-operated combination weigher and the platform scale.

BACKGROUND ART

A combination weigher is one kind of a weighing apparatus which includes a plurality of weighing devices (weighers) and can perform combination calculation using weights of objects which are weighed by the weighing devices. In the combination calculation, a combination of weighing devices is selected, in which a combination weight of the objects which is formed by combination is closest to a target weight of the objects (not less than the target weight) and falls within an allowable range of the target weight (range between the target weight and an upper limit value of the target weight). A batch of the objects on the weighing devices selected in this way are taken to outside by a suitable method.

The above stated combination weigher is categorized into a fully-automatic combination weigher, a semiautomatic combination weigher, and a hand-operated combination weigher, depending on a feeding method of the objects to the weighing devices and a taking-out method of the objects from the weighing devices.

In the fully-automatic combination weigher, feeding of the objects to the weighing devices and taking-out of the objects from the weighing devices are performed in a fully-automatic manner.

In the semiautomatic combination weigher, only feeding of the objects to the weighing devices (or the corresponding feeding hoppers) is performed by an operator's hand operation (e.g., see Patent Literatures 1 and 2).

In hand-operated combination weigher, the feeding of the objects to the weighing devices and taking-out of the objects from the weighing devices are performed by an operator's hand operation (e.g., see Patent Literature 3).

In the case of products which are non-uniform in shape or are more likely to lose their shapes, a problem arises, if feeding of the products to the weighing devices and taking-out of the products from the weighing devices are performed in an automatic manner. As examples of products for which the automatic feeding of the products to the weighing devices and the automatic taking-out of the products from the weighing devices are not suitable, there are fresh products such as fishery products (sea food) (seasoned cod roe, salmon roe, herring roe, etc.) and agricultural products (asparagus, tomato, Japanese mizuna, etc.). For example, if a shape of the seasoned cod roe is lost in the automatic feeding and the automatic taking-out, its commercial value will be significantly impaired. Because of this, the hand-operated combination weigher is optimally used to fill such products into fixed-amount containers.

CITATION LISTS

Patent Literature

Patent Literature 1: Japanese Laid-Open Patent Application Publication No. 2006-125925

Patent Literature 2: Japanese Laid-Open Patent Application Publication No. 2007-64704

Patent Literature 3: Japanese Laid-Open Patent Application Publication No. Sho. 63-148129

SUMMARY OF THE INVENTION

Technical Problem

However, in the hand-operated combination weigher, a work in which the operator puts the objects on the weighing device (weighing tray) and a work in which the operator takes out the objects from the weighing device (hereinafter, as necessary, these works will be referred to as "handling work of the objects") are burdensome to the operator.

For example, in a case where the objects are filled into containers, the handling work of the objects is not so burdensome to the operator if the objects corresponding to one container are as few as two or three. However, as the objects increase in number, the handling work increases in number, which results in a significant reduction of the operator's work efficiency.

In a case where the objects are fresh food which must be treated with a greatest care, for example, expensive seasoned cod roe, a severe damage (e.g., bruise or the like of the objects) to its product quality might occur, due to the operator's handling mistake of the product. Therefore, in this case, the handling works are preferably minimized in number. In other words, the operator's intervention in treating of the objects is preferably lessened.

The present invention is made in view of the above stated circumstances, and an object of the present invention is to provide a weighing system and a weighing work method which can reduce the number of times of the handling work of the objects in the hand-operated combination weigher as compared to a conventional weighing system and a conventional weighing work method.

Solution to Problem

To achieve the above object, according to the present invention, there is provided a weighing system comprising: a platform scale on which a container containing objects is placed; and a hand-operated combination weigher including a plurality of weighing trays on which the objects are put; wherein a controller of the weighing system derives a target weight of the objects in the combination weigher using a weight of the container which is weighed by the platform scale; and the controller selects a combination of the weighing trays so that a combination weight of the objects on the weighing trays falls within an allowable range of the target weight.

In this configuration, the number of times of the handling work of the objects in the hand-operated combination weigher can be reduced as compared to the conventional example. As a result, the handling work can be performed efficiently and work mistakes can be reduced.

According to the present invention, there is provided a weighing work method comprising: a step of stacking containers in plural layers on a platform scale of subtraction type, each of the containers containing the objects of predetermined number; a step of putting the objects of predetermined number on each of a plurality of weighing trays in a hand-operated combination weigher; a step of obtaining a weight of one container when one of the containers is taken out of the platform scale; a step of deriving a target weight of the objects in the combination weigher using the weight of the container; a step of selecting a combination of the weighing trays so that a combination weight of the objects on the weighing trays falls within an allowable range of the target weight; and a step of storing the objects on the weighing trays selected to make up the combination into an empty space of the container taken out.

In accordance with this configuration, a filling work of the objects into the container is performed in a stage of preparation of the weighing operation of the objects. This makes it possible to reduce the number of times of the handling work of the objects in the combination weigher, and hence achieve high efficiency of the handling work and reduction of the work mistakes.

In the weighing work method of the present invention, a makeup box of the objects may be used as the container.

In this configuration, after storing the objects into the container (makeup box), the container can be directly shipped out to a market, which is advantageous.

The advantages achieved by the weighing system and the weighing work method of the present invention as described above are beneficial in the case where the objects are fresh food which must be treated with a greatest care, for example, expensive seasoned cod roe M.

Firstly, since the handling works can be preferably reduced in number, the operator's intervention in treating of the objects is preferably lessened, and hence a possibility of severe damage (e.g., bruise or the like of the objects) to the quality of the expensive products can be lessened appropriately and satisfactorily.

Secondly, in the stage of preparation of the weighing operation of the objects, the operator can focus on storing a most part of the objects into the container carefully without caring about the weighing of the objects. Therefore, the operator's mistakes of handling of the objects can be reduced, and hence, a possibility of severe damage (e.g., bruise or the like of the objects) to the quality of the expensive products can be lessened appropriately and satisfactorily.

In the weighing system of the present invention, the combination weigher may include a notification means; and the controller may notify the selected weighing trays using the notification means.

This enables the operator to promptly know the weighing trays selected to make up the combination.

In the weighing system of the present invention, the controller may obtain an allowable weight range of the weight of the container; and when the weight of the container falls outside the allowable weight range, the controller does not select the combination of the weighing trays and may notify an error.

In this configuration, the controller can determine whether or not the weight of the container having been weighed in the platform scale is appropriate. For example, if there is no possibility (or least possibility) that the combination is made in the combination weigher, the combination process for the weighing trays need not be performed.

The weighing system of the present invention, may further comprise: a means which inputs a total weight of the objects to be filled into the container and a tare weight of the container; and the target weight may be a weight derived by calculating a sum of the total weight of the objects and a tare weight of the container, and calculating a difference between the sum and the weight of the container.

This makes it possible to appropriately derive the target weight of the objects in the combination weigher.

The weighing system of the present invention may further comprise a means which inputs the total number of the objects to be filled into the container, the number of objects inside of the container on the platform scale, and the number of objects put on each of the weighing trays in a case where the number of objects put on each of the weighing trays is fixed; wherein the target number of the weighing trays selected to make up the combination may be a value obtained by dividing a difference between the total number of the objects and the number of objects inside of the container by the number of objects put on each of the weighing trays.

This makes it possible to appropriately derive the target number of the weighing trays selected to make up the combination in the combination weigher.

The above and further objects, features and advantages of the invention will more fully be apparent from the following detailed description with reference to the accompanying drawings.

Advantageous Effects of the Invention

In accordance with the present invention, it is possible to attain a weighing system and a weighing work method which can reduce the number of times of a handling work of objects in a hand-operated combination weigher as compared to a conventional example.

BRIEF DESCRIPTION OF THE DRAWINGS

FIG. 1 is a perspective view showing an exemplary weighing system according to an embodiment of the present invention.

DESCRIPTION OF EMBODIMENTS

Figure 2:
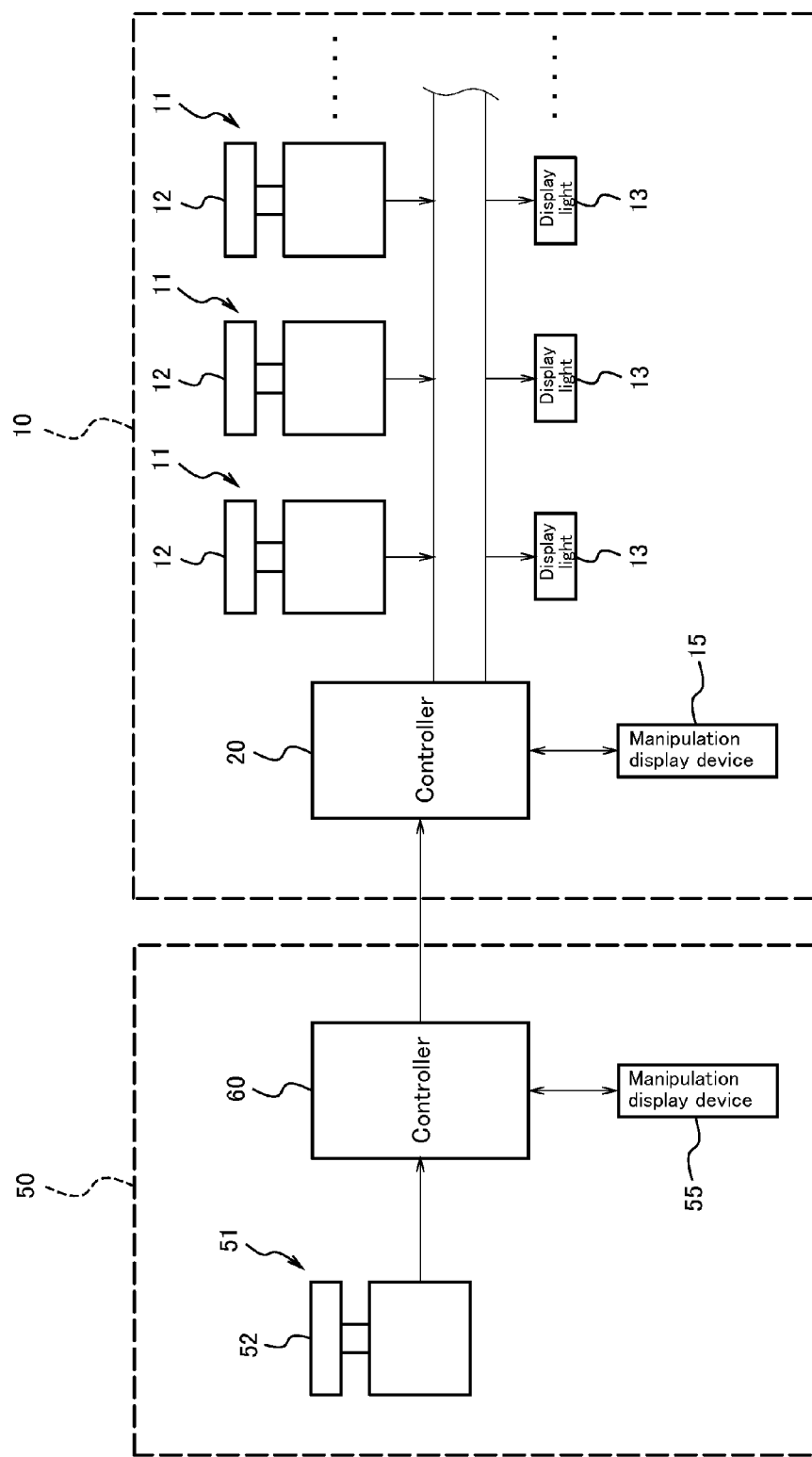
FIG. 2 is a block diagram showing an exemplary internal configuration of the weighing system according to the embodiment of the present invention.

Hereinafter, an embodiment of the present invention will be described in detail with reference to the drawings. Throughout the drawings, the same or corresponding components are designated by the same reference numerals and will not be described in repetition in some cases.

The present invention is not limited to the embodiment described below. That is, specific description merely provide features of "weighing system" and "weighing work method" of the present invention.

For example, "display light 13" described below in the embodiment is merely an example of "notification means" which is an element of the present invention. Although in the embodiment, the "display light 13" is a visual notification device in which a color (one of various colors) is turned ON, blinks, or is turned OFF, a specific example of the "notification means" of the present invention is not limited to such a visual notification device and may be an audio notification device using a voice such as a speaker.

As a specific example of "means which inputs a total weight of the objects to be filled into the container and a tare weight of the container" in the present invention and a specific example of "means which inputs the total number of the objects to be filled into the container, the number of the objects inside of the container on a platform scale, and the number of the objects in a case where the objects of a fixed number are put on each of weighing trays" in the present invention, "manipulation display device 15" of a combination weigher 10 will be described in the embodiment below. However, these means are not limited to the "manipulation display device 15" of the combination weigher 10.

For example, as will be described in Modified example 4 below, when one empty container is put on and put out of a weighing platform 52 of a digital platform scale 50, a controller 60 of the digital platform scale 50 is able to automatically obtain (calculate) a tare weight of the container based on a difference in a weighed value of the container 51 at this time. In this case, the weighing platform 52 of the digital platform scale 50 corresponds to "means which inputs the tare weight of the container" in the present invention.

(Embodiments)

FIG. 1 is a perspective view showing an exemplary weighing system according to an embodiment of the present invention. FIG. 2 is a block diagram showing an exemplary internal configuration of the weighing system according to the embodiment of the present invention.

As shown in FIG. 1, a weighing system 100 includes a hand-operated combination weigher 10, and a digital platform scale 50 of subtraction type (electronic platform scale) corresponding to a weigher provided outside of the combination weigher 10.

First of all, a configuration of the combination weigher 10 will be described with reference to the drawings.

As shown in FIG. 1, the combination weigher 10 includes a plurality of (twelve in the present embodiment) weighing devices 11 on which objects of predetermined number (two pieces of seasoned cod roe M in the example of FIG. 4) are to be put and a support table 16 to which the weighing devices 11 are fastened.

Each of the weighing devices 11 includes a weighing tray 12 on which the objects are to be put, and a weight sensor (not shown) such as a load cell or the like which supports the weighing tray 12 and is able to weigh a weight of the objects put on the weighing tray 12. As shown in FIG. 2, each of weighing devices 11 is connected to a controller 20 (will be described in detail later) via a known signal processing circuit (e.g., amplifier, A/D converter, etc., (not shown)).

Thus, the weight of the objects put on the weighing tray 12 which is weighed by the weighing device 11 (hereinafter "weighed value of the objects on the weighing tray 12") is input to the controller 20.

In the combination weigher 10, the objects are put on the weighing trays 12 by the operator's hand operation, combination calculation is performed automatically for the weighed values of the objects on the weighing trays 12, and then the objects are taken out of the weighing trays 12 selected to make up a combination by the operator's hand operation.

As shown in FIG. 1, the combination weigher 10 includes a plurality of display lights 13 (twelve in the present embodiment) attached to a portion of the support base 16 in locations in the vicinity of the weighing trays 12. Specifically, the display lights 13 are attached to an uppermost surface of the support base 16 to correspond to the weighing devices 11 (weighing trays 12), respectively. The display lights 13 may be constituted by, for example, LEDs (light-emitting diodes).

The controller 20 controls ON, blinking, or OFF of the display lights 13 based on a result of the combination calculation in the combination weigher 10. Thus, the display lights 13 may be used as notification means which indicates achievement of making of the combination and a command for replacing the objects regarding the corresponding weighing devices 11 (its detail will be described later).

As shown in FIGS. 1 and 2, the combination weigher 10 includes the controller 20 and a manipulation display device 15.

The manipulation display device 15 includes, for example, a liquid crystal display of touch screen type and is fastened to the support base 16. The manipulation display device 15 has a function of a means which inputs to the controller 20 commands of manipulation of an operation start of the combination weigher 10, an operation stop of the combination weigher 10, etc., and various operating conditions of the combination weigher 10, and a function of a means which outputs a combination weight calculated by the controller 20, etc. . . .

The controller 20 is constituted by a microcomputer, etc., which is built into the manipulation display device 15 and includes a processing control section such as CPU, a memory section such as RAM or ROM, etc. . . .

In the memory section of the controller 20, the operating conditions and the control programs are stored. When the operation of the combination weigher 10 starts, the processing control section of the controller 20 reads the operating conditions and the control programs from the memory section. The processing control section of the controller 20 controls the overall operation of the combination weigher 10 while controlling components of the combination weigher 10.

For example, the controller 20 performs the combination calculation based on the weighed values of the objects on the weighing trays 12 and performs a process for deriving an optimal combination from among combinations of the weighing trays 12 so that the combination weight of the objects falls within an allowable range of the objects.

Then, the controller 20 turns ON the display lights 13 corresponding to the weighing trays 12 selected to make up the combination and displays on the liquid crystal display of the manipulation display device 15 the combination weight of the objects put on the weighing trays 12 selected to make up the combination.

Next, a configuration of the digital platform scale 50 will be described with reference to the drawings.

Figure 4:
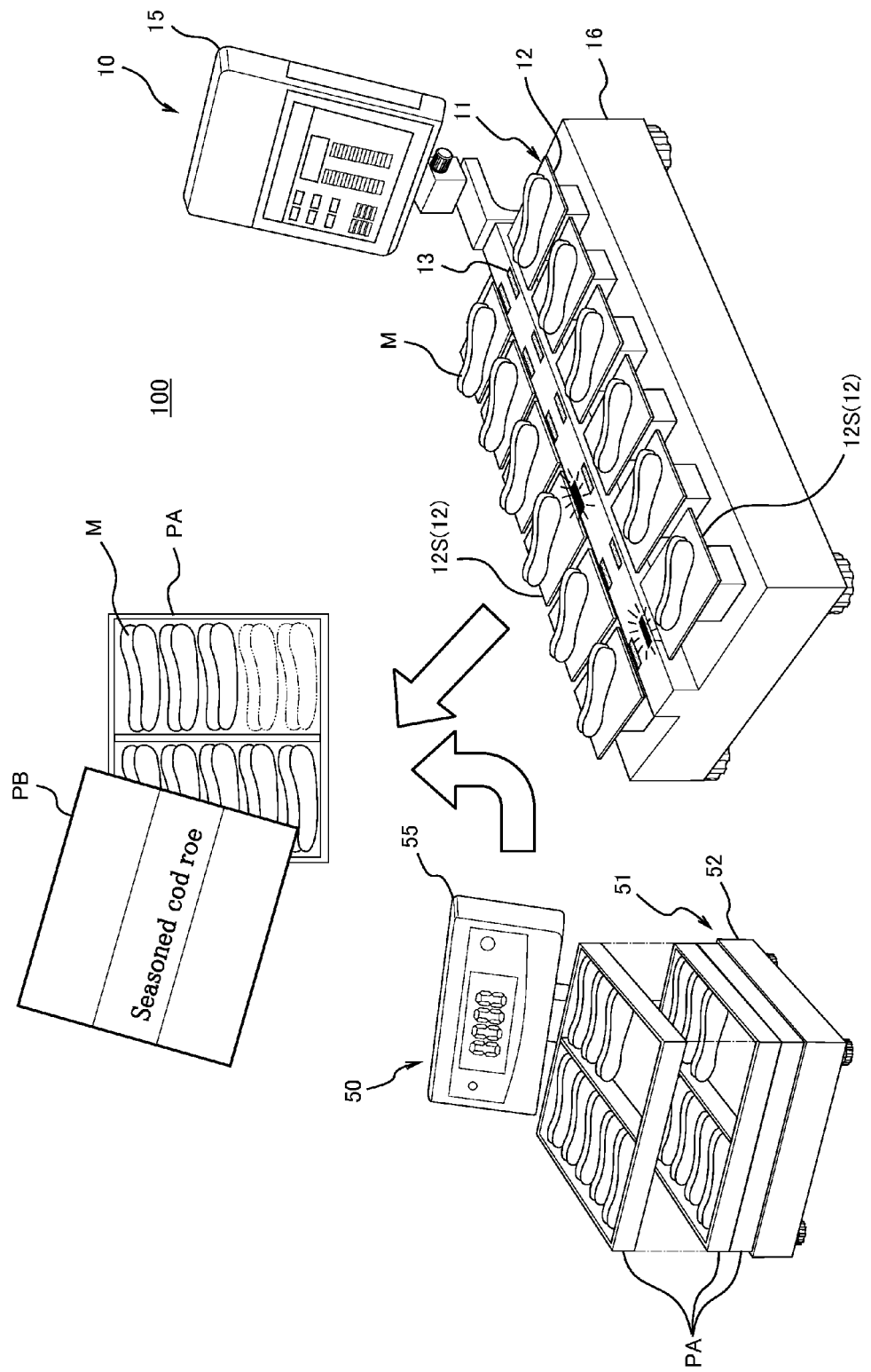
FIG. 4 is a view explaining a weighing operation of the weighing system according to the embodiment of the present invention.

As shown in FIG. 1, the digital platform scale 50 includes a weighing device 51 having containers (makeup boxes PA with upper lids PB removed therefrom in the example of FIG. 4) stacked in plural layers, each of containers accommodating objects of predetermined number (16 pieces of seasoned cod roe M in the example of FIG. 4).

The weighing device 51 includes a weighing platform 52 on which the containers are stacked, a weight sensor (not shown) such as a load cell which supports the weighing platform 52 and is able to weigh a weight of the containers stacked on the weighing platform 52. As shown in FIG. 2, the weighing device 51 is connected to a controller 60 (will be described in detail later) via a known signal processing circuit (e.g., amplifier, A/D converter, etc., (not shown)).

Thereby, the weight (hereinafter referred to as "weighed value of the containers on the weighing platform 52) of the containers stacked in multiple layers on the weighing platform 52 which is weighed by the weighing device 51, is input to the controller 60.

As shown in FIGS. 1 and 2, the digital platform scale 50 includes the controller 60 and a manipulation display device 55.

The manipulation display device 55 includes, for example, a liquid crystal display. The manipulation display device 55 has a function of a means which inputs to the controller 60 commands of manipulation of an operation start of the digital platform scale 50, an operation stop of the digital platform scale 50, etc., and various operating conditions of the digital platform scale 50, and a function of a means which outputs a weight of the container calculated by the controller 60, etc.

The controller 60 is constituted by a microcomputer, etc., which is built into the manipulation display device 55 and includes a processing control section such as CPU, a memory section such as RAM or ROM, etc.

In the memory section of the controller 60, the operating conditions and the control programs are stored. When the operation of the digital platform scale 50 starts, the processing control section of the controller 60 reads the operating conditions and the control programs from the memory section. The processing control section of the controller 60 controls the overall operation of the digital platform scale 50 while controlling components of the digital platform scale 50.

For example, the controller 60 detects that the container has been taken out of the weighing platform 52 based on a change in the weighed value of the container on the weighing platform 52.

Then, the controller 60 calculates the weight of the container having been taken out of the weighing platform 52, based on a difference in the weighed value of the container on the weighing platform 52 between before the container is taken out of the weighing platform 52 and after the container is taken out of the weighing platform 52 and displays the weight of the container on the liquid crystal display of the manipulation display device 55.

As shown in FIG. 2, the controller 20 of the combination weigher 10 and the controller 60 of the digital platform scale 50 are connected to each other via a wired or wireless communication line.

A weighing system 100 of the present embodiment has a feature that the weight of the container is transmitted from the controller 60 of the digital platform scale 50 to the controller 20 of the combination weigher 10, when the container is taken out of the weighing platform 52 of the digital platform scale 50. This will be described in detail in a weighing operation of the weighing system 100 below.

Figure 3:
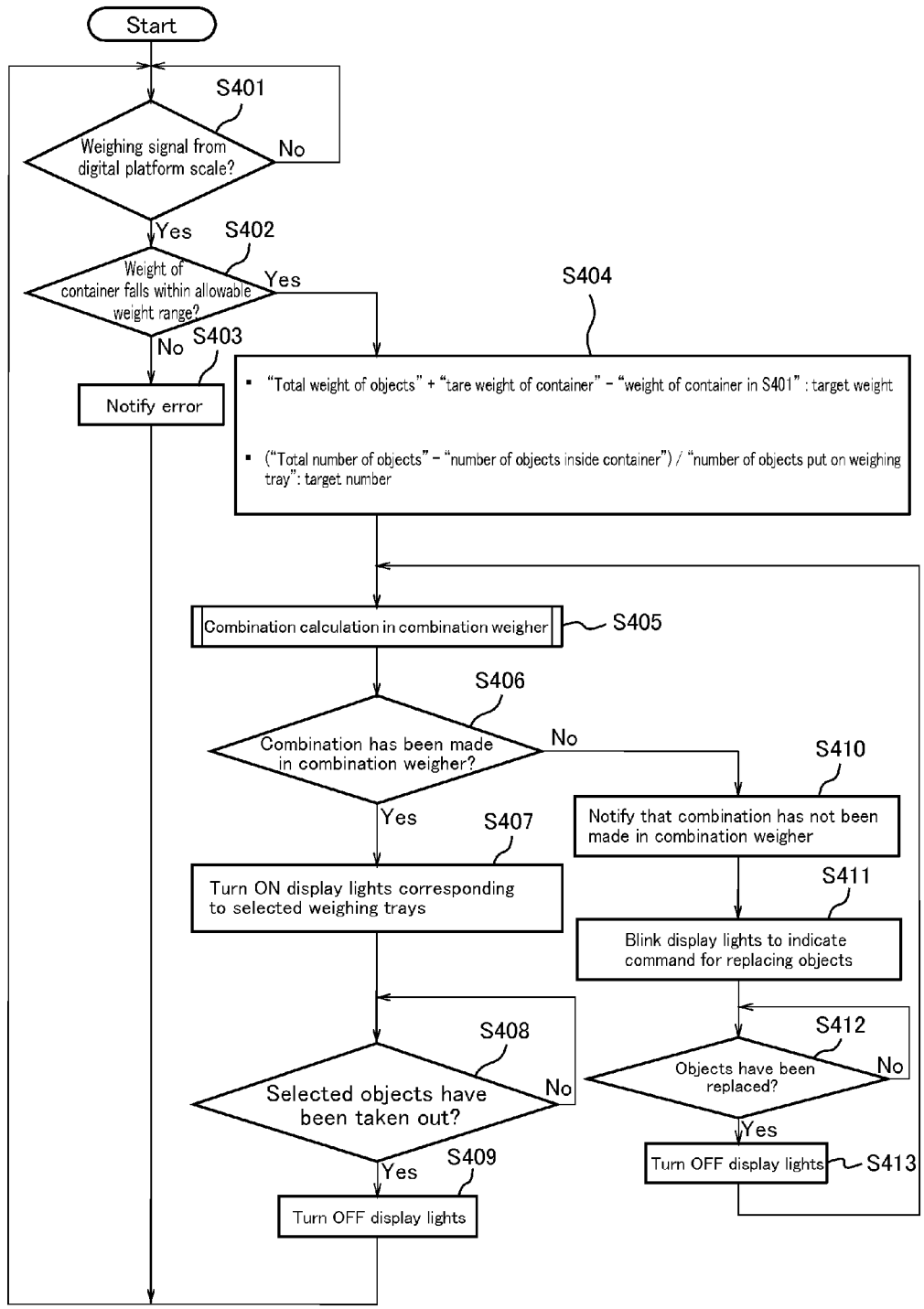
FIG. 3 is a flowchart showing an exemplary weighing operation of the weighing system according to the embodiment of the present invention.

FIG. 3 is a flowchart showing an exemplary weighing operation of the weighing system according to the embodiment of the present invention. FIG. 4 is a view explaining a weighing operation of the weighing system according to the embodiment of the present invention.

The following operation is controlled by the controllers 20 and 60.

All information required to perform the processing in FIG. 3 are input to (set in) the controller 20 by using the manipulation display device 15 and stored in the memory section of the controller 20.

As examples of the information, there are a total weight of the objects to be filled into the container, a tare weight of the container, the total number of the objects to be filled into the container, the number of objects in the container on the weighing platform 52, the number of the objects put on each of the weighing trays 12 (the number is a fixed number), and an allowable range of a target weight of the objects (in the present embodiment, upper limit value of the target weight) in the combination weigher 10.

Prior to the weighing operation in the weighing system 100 of the present embodiment, the operator performs a work for preparing the weighing operation as described above.

The operator puts the objects of predetermined number (16 pieces of seasoned cod roe M in the example of FIG. 4) into the container (makeup box PA in the example of FIG. 4) while leaving a suitable empty space (empty space corresponding to 4 pieces of seasoned cod roe M in the example of FIG. 4). Then, the container is stacked on the weighing platform 52 of the digital platform scale 50, and finally the containers are stacked in plural layers on the weighing platform 52.

The operator puts the objects of predetermined number (2 pieces of seasoned cod roe M in the example of FIG. 4) on each of the weighing trays 12 of the combination weigher 10.

After the above stated preparation work has been finished, the operator presses a start button of the manipulation display device 15. Thereupon, the weighing system 100 starts the processing of FIG. 3.

In step S401, the controller 20 confirms whether or not there is a weighing signal from the digital platform scale 50.

When the controller 20 determines that there is no weighing signal from the digital platform scale 50 ("No" in step S401), it maintains a present state of the weighing system 100.

When the operator takes one container out of the weighing platform 52 of the digital platform scale 50, the controller 60 of the digital platform scale 50 calculates the weight of one container, based on a difference in the weighed value of the container on the weighing platform 52 between before the container is taken out of the weighing platform 52 and after the container is taken out of the weighing platform 52, after the weighed value of the container on the weighing platform 52 is stabilized. Then, the weight of the container is transmitted from the controller 60 of the digital platform scale 50 to the controller 20 of the combination weigher 10 as the weighing signal from the digital platform scale 50. In step S401, the controller 20 determines that there is a weighing signal from the digital platform scale 50 ("Yes" in step S401), and the process goes to a subsequent step (step S402).

In step S402, the controller 20 determines whether or not the weight of the container in step S401 falls within an allowable weight range.

The phrase "the weight falls within the allowable weight range of the weight of the container" refers to a weight range which allows the combination of the objects to be made in the combination weigher 10. On the other hand, the phrase "the weight falls outside the allowable weight range of the weight of the container" refers to a weight range which does not allow (or has a least possibility that it allows) the combination of the objects to be made in the combination weigher 10.

Now, the allowable weight range will be described using specific numeric values.

For example, it is assumed that the target weight of the objects in the combination weigher is 950 g and the upper limit value of the target weight is 1050 g (i.e., the allowable range of the target weight is 950 g to 1050 g). Also, it is assumed that the weight range of the objects is (100 g±10 g), eight objects are taken out of the weighing platform of the digital platform scale, and the combination weigher performs combination calculation to provide a combination of 2 objects.

A maximum combination weight in the combination weigher is 110 g×2=220 g. In a case where the weight of the objects in the container which is transmitted from the digital platform scale is 750 g, a maximum weight (750 g+220 g=970 g) of the objects may fall within the allowable range (950 g to 1050 g) of the target weight. Therefore, in this case, in step S402, the controller 20 determines that the weight of the container falls within the allowable weight range.

On the other hand, in a case where the weight of the objects in the container which is transmitted from the digital platform scale is 700 g, a maximum weight (700 g+220 g=920 g) of the objects does not fall into the allowable range (950 g to 1050 g) of the target weight. Therefore, in this case, in step S402, the controller 20 determines that the weight of the container falls outside the allowable weight range.

When the controller 20 determines that the weight of the container falls outside the allowable weight range ("No" in step S402), it notifies an error using a suitable notification means (step S403). Thereafter, the process returns to step S401 and the weighing operation in the present case is finished.

As described above, the controller 20 can determine whether or not the weight of the container having been weighed in the digital platform scale 50 is appropriate. For example, if there is no possibility (or least possibility) that the combination is made in the combination weigher 10, the combination process for the weighing trays 12 need not be performed.

On the other hand, when the controller 20 determines that the weight of the container falls within the allowable weight range ("Yes" in step S402), the combination weigher 10 performs the combination calculation in step S404 and the following steps.

In step S404, the controller 20 derives the target weight of the objects selected to make up the combination in the combination weigher 10, using the weight of the container in step S401.

Specifically, the weight derived by calculating a sum of the total weight of the objects to be filled into the container and the tare weight of the container, and calculating a difference between the sum and the weight of the container in step S401, corresponds to the target weight.

In the above described manner, the weighing system 100 of the present embodiment is able to appropriately derive the target weight of the objects in the combination weigher 10.

In step S404, the controller 20 derives the target number of the weighing trays 12 selected to make up the combination in the combination weigher 10.

Specifically, a value derived by dividing a difference between the total number of objects (20 pieces of seasoned cod roe M in the example of FIG. 4) to be filled into the container and the number of the objects (16 pieces of seasoned cod roe M in the example of FIG. 4) inside of the container by the number of objects (2 pieces of seasoned cod roe M in the example of FIG. 4) on the weighing tray 12, corresponds to the above stated target weight number. That is, in the weighing system 100 of FIG. 4, the target number of the weighing trays 12 is (20−16)/2=2.

In the above described manner, the weighing system 100 of the present embodiment is able to appropriately derive the target number of the weighing trays 12 selected to make up the combination.

Then, the controller 20 performs the combination calculation in the combination weigher 10 (step S405).

Specifically, the controller 20 selects a combination of the weighing trays 12 of the target number so that a combination weight of the objects on the weighing trays 12 falls into the allowable range of the target weight using the combination weigher 10.

Thus, the combination weigher 10 performs a combination process for obtaining a combination of a fixed number and a fixed amount of the objects.

Then, the controller 20 determines whether or not the combination has been made in the combination weigher 10 (step S406).

When the controller 20 determines that the combination has been made in the combination weigher 10 ("Yes" in Step S406), it turns ON the display lights 13 corresponding to the weighing trays 12 selected to make up the combination (step S407). In FIG. 4, the ON-states of the display lights 13 corresponding to the two weighing trays 12 are indicated by black colors.

This enables the operator to promptly know the weighing trays 12 selected to make up the combination.

Then, the controller 20 determines whether or not the objects have been taken out of the weighing trays 12 selected to make up the combination (step S408).

The controller 20 can easily perform the determination in step S408 by monitoring an output of the weight sensor of the weighing device 11 all the time.

When the controller 20 determines that the objects have not been taken out of the weighing trays 12 selected to make up the combination ("No" in step S408), it maintains a present state of the combination weigher 10.

On the other hand, when the controller 20 determines that the objects have been taken out of the weighing trays 12 selected to make up the combination ("Yes" in step S408), it turns OFF the display lights 13 (step S409). The process returns to step S401 and one weighing operation in the weighing system 100 is finished.

After the above stated weighing operation, as shown in FIG. 4, the operator stores the objects (4 pieces of seasoned cod roe M in the example of FIG. 4) having been take out in step S408 into the empty space in the container (makeup box PA in the example of FIG. 4) by the operator's hand operation. After that, the makeup box PA is attached with the upper lid PB and is shipped out to a market.

On the other hand, when the controller 20 determines that the combination has not been made in the combination weigher 10 ("No" in Step S406), it notifies that the combination has not been made in the combination weigher 10, using the suitable notification means.

At this time, a command for replacing the objects is indicated by blinking of the display lights 13 (step S411).

The combination weigher 10 in the weighing system 100 of the present embodiment incorporates a function for indicating the command for replacing the objects, in which the weighing trays 12 which may have a high possibility of making up the combination (e.g., weighing trays 12 on which the objects having a weight farthest from the average unit weight of the objects are put) is notified to the operator by the display lights 13. The function for indicating the command for replacing the objects is known. Therefore, detailed description of the function will not be given.

Then, the controller 20 determines whether or not the objects have been replaced (step S412).

The controller 20 can easily perform the determination in step S412 by monitoring an output of the weight sensor of the weighing device 11 all the time.

When the controller 20 determines that the objects have not been replaced ("No" in step S412), it maintains a present state of the combination weigher 10.

On the other hand, when the controller 20 determines that the objects have been replaced ("Yes" in step S412), it turns OFF the display lights 13 (step S413), and repeats the operation in step S405 and the following steps.

As described above, the weighing system 100 of the present embodiment includes the digital platform scale 50 on which the container containing the objects is placed, and the hand-operated combination weigher 10 including the plurality of weighing trays 12 on which the objects are put. The controller 20 in the weighing system 100 derives the target weight of the objects in the combination weigher 10 using the weight of the container having been weighed by the digital platform scale 50, and selects the combination of the weighing trays 12 so that the combination weight of the objects on the weighing trays 12 falls into the allowable range of the target weight.

Thus, the number of times of the handling work of the objects in the hand-operated combination weigher 10 can be reduced as compared to the conventional weighing system.

As a result, the handling work can be performed efficiently and work mistakes can be reduced.

A weighing work method of the present embodiment includes a step of stacking the containers in plural layers on the digital platform scale 50 of subtraction type, each of the containers containing the objects of predetermined number, a step of putting the objects of predetermined number on each of the plurality of weighing trays 12 in the hand-operated combination weigher 10, a step of obtaining the weight of one container when one of the containers is taken out of the digital platform scale 50, a step of deriving the target weight of the objects in the combination weigher 10 using the weight of the container, a step of selecting the combination of the weighing trays 12 so that the combination weight of the objects on the weighing trays 12 falls into the allowable range of the target weight, and a step of storing the objects on the weighing trays 12 selected to make up the combination into the empty spaces of the containers taken out.

Thus, a filling work of the objects into the container is performed in a stage of preparation of the weighing operation of the objects. This makes it possible to significantly reduce the number of times of the handling work of the objects in the combination weigher 10, and hence achieve high efficiency of the handling work and reduction of the work mistakes.

The advantages achieved by the weighing system 100 and the weighing work method of the present embodiment as described above are beneficial in the case where the objects are fresh food which must be treated with a greatest care, for example, expensive seasoned cod roe M.

Firstly, since the handling works are preferably reduced in number, the operator's intervention in treating of the objects is preferably lessened, and hence, a possibility of severe damage (e.g., bruise or the like of the objects) to the quality of the expensive products can be lessened appropriately and satisfactorily.

Secondly, in the stage of preparation of the weighing operation of the objects, the operator can focus on storing a most part of the objects into the container carefully without caring about the weighing of the objects. Therefore, the operator's mistakes in handling of the objects can be reduced, and hence, a possibility of severe damage (e.g., bruise or the like of the objects) to the quality of the expensive products can be lessened appropriately and satisfactorily.

Modified Example 1

An optimal ratio between the number of objects on the digital platform scale 50 and the number of objects selected by the combination weigher 10 is not limited to the above described ratio in the present embodiment (16:4).

The optimal number ratio may be predicted by numeric value simulation.

For example, a standard deviation of the objects is found from samples of the objects. By conducting a combination simulation based on this standard deviation, a ratio of achievement of making of the combination in the combination weigher 10 can be calculated. The optimal number ratio can be predicted from a total work time derived by the ratio of achievement of making of the combination and the number of times of the handling works of the objects (work time per handling work).

Various algorithms of the combination simulation can be constructed using mathematical statistics. Therefore, its detail will not be described herein.

Modified Example 2

Although the example in which the weighing system 100 of the present embodiment uses the digital platform scale 50 of subtraction type, the present invention is not limited to this, but a digital platform scale of addition type may be used.

When the digital platform scale 50 of subtraction type is used like the present embodiment, the weighing work in the weighing system 100 can be carried out efficiently in a state in which the containers are stacked in plural layers together on the weighing platform 50. That is, in this case, since a work for putting on and out of the container every time is omitted, work efficiency of the weighing work can be significantly improved as compared to a case in which the digital platform scale of addition type is used.

Modified Example 3

The weighing operation (FIG. 3) of the weighing system 100 of the present embodiment is merely exemplary, but may be modified into various processing flows.

For example, in the processing flow in the weighing operation of the weighing system 100 of FIG. 3, the process for replacing the objects (step S412) and the combination calculation process performed by the combination weigher 10 (step S405) are repeated until the combination in the combination weigher 10 has been made in step S406.

Instead of the processing flow of FIG. 3, a processing flow may be constructed, in which the operator may determine whether or not to finish the weighing operation of the weighing system 100 and may command this determination by using a suitable re-calculation key, a suitable cancellation key (not shown), etc., regarding the combination calculation, if the combination has not been made in the combination weigher 10 in step S406 (detailed description and detailed illustration of the processing flow are omitted).

Modified Example 4

Although in the weighing system 100 of the present embodiment, the example in which the tare weight of the container is input to (set in) the controller 20 of the combination weigher 10 by using the manipulation display device 15 of the combination weigher 10 has been described, the present invention is not limited to this.

For example, the tare weight of the container may be input to (set in) the controller 20 in another methods described as below.

Firstly, the operator may input the tare weight of the container to the controller 60 of the digital platform scale 50, by using the manipulation display device 55 of the digital platform scale 50. The tare weight of the container is transmitted from the controller 60 to the controller 20, and thereby the tare weight of the container is input to (set in) the controller 20.

Secondly, one empty container is put on and out of the weighing platform 52 of the digital platform scale 50. Thereupon, the controller 60 of the digital platform scale 50 can automatically obtain (calculate) the tare weight of the container based on a difference in the weighed value of the weighing device 51. The tare weight of the container is transmitted from the controller 60 to the controller 20, and thereby the tare weight of the container is input to (set in) the controller 20.

In another modified example, there is a method in which a numeric value obtained by adding the tare weight of the container to the target weight of the objects selected to make up the combination in the combination weigher 10 is set as a temporary target weight. That is, the controller 20 may modify the algorithm of the weighing operation in the weighing system 100 of FIG. 3 so that the controller 20 can perform the combination calculation based on the temporary target weight.

The phrase "numeric value obtained by adding the tare weight of the container to the target weight of the objects is set" means that the temporary target weight is set to 505 g, for example, when a real target weight of the objects is 500 g and the tare weight of the container is 5 g. In the combination calculation of the weighed values of the objects put on the weighing trays 12 in the combination weigher 10, compensation is made for the tare weight of the container automatically.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention provides a weighing system and a weighing work method which can reduce the number of times of a handling work of objects in a hand-operated combination weigher as compared to conventional examples. Therefore, the present invention can be used in weighing systems using hand-operated combination weighers.

REFERENCE SINGS LISTS 10 combination weigher
11 weighing device of combination weigher
12, 12S weighing tray
13 display light
15 manipulation display device of combination weigher
16 support base
20 controller of combination weigher
50 digital platform scale
51 weighing device of digital platform scale
52 weighing platform
55 manipulation display device of digital platform scale
60 controller of digital platform scale
100 weighing system
M seasoned cod roe (one example of objects)
PA makeup box (one example of container)
PB upper lid of makeup box

The invention claimed is:

1. A hand-operated weighing system comprising;
a platform scale on which a container containing objects is placed; and
a hand-operated combination weigher including a plurality of weighing trays on which the objects are put;
wherein a controller of the weighing system derives a target weight of the objects in the combination weigher using a weight of the container which is weighed by the platform scale;
the controller selects a combination of the weighing trays so that a combination weight of the objects on the weighing trays falls within an allowable range of the target weight; and
a means which inputs the total number of the objects to be filler into the container, the number of objects inside of the container on the platform scale, and the number of objects put on each of the weighing trays in a case where the number of objects put on each of the weighing trays is fixed;
wherein a target number of the weighing trays selected to make up the combination is a value obtained by dividing a difference between the total number of the objects and the number of objects inside of the container by the number of objects put on each of the weighing trays.

2. The hand-operated weighing system according to claim 1,
wherein the combination weigher includes a notification means; and
wherein the controller notifies the selected weighing trays using the notification means.

3. The hand-operated weighing system according to claim 1,
wherein the controller obtains an allowable weight range of the weight of the container; and
wherein when the weight of the container falls outside the allowable weight range, the controller does not select the combination of the weighing trays and notifies an error.

4. The hand-operated weighing system according to claim 1, further comprising:
a means which inputs a total weight of the objects to be filled into the container and a tare weight of the container;
wherein the target weight is a weight derived by calculating a sum of the total weight of the objects and a tare weight of the container, and calculating a difference between the sum and the weight of the container.

5. A hand-operated weighing work method comprising:
a step of stacking containers in plural layers on a platform scale of subtraction type, each of the containers containing the objects of predetermined number;
a step of putting the objects of predetermined number on each of a plurality of weighing trays in a hand-operated combination weigher;
a step of obtaining a weight of one container when one of the containers is taken out of the platform scale;
a step of deriving a target weight of the objects in the combination weigher using the weight of the container;
a step of selecting a combination of the weighing trays so that a combination weight of the objects on the weighing trays falls within an allowable range of the target weight;
a step of storing the objects on the weighing trays selected to make up the combination into an empty space of the container taken out; and
a step of inputting the total number of the objects to be filled into the container, the number of objects inside of the container on the platform scale, and the number of objects put on each of the weighing trays in a case where the number of objects put on each of the weighing trays is fixed;
wherein a target number of the weighing trays selected to make up the combination is a value obtained by dividing a difference between the total number of the objects and the number of objects inside of the container by the number of objects put on each of the weighing trays.

6. The hand-operated weighing work method according to claim 5,
wherein a makeup box of the objects is used as the container.

* * * * *